United States Patent
Gordon et al.

(10) Patent No.: US 10,768,337 B2
(45) Date of Patent: Sep. 8, 2020

(54) COMPUTED TOMOGRAPHY (CT) SECURITY INSPECTION SYSTEM WITH ENHANCED X-RAY SHIELDING

(71) Applicant: Photo Diagnostic Systems, Inc., Boxboro, MA (US)

(72) Inventors: Bernard M. Gordon, Manchester, MA (US); Olof Johnson, Ashburnham, MA (US)

(73) Assignee: Photo Diagnostic Systems, Inc., Boxboro, MA (US)

( * ) Notice: Subject to any disclaimer, the term of this patent is extended or adjusted under 35 U.S.C. 154(b) by 0 days.

(21) Appl. No.: 16/194,790

(22) Filed: Nov. 19, 2018

(65) Prior Publication Data
US 2019/0154869 A1    May 23, 2019

Related U.S. Application Data

(63) Continuation-in-part of application No. 16/178,821, filed on Nov. 2, 2018.
(Continued)

(51) Int. Cl.
*G01V 5/00* (2006.01)
*G01N 23/046* (2018.01)
(Continued)

(52) U.S. Cl.
CPC .......... *G01V 5/005* (2013.01); *G01N 23/046* (2013.01); *G21F 1/085* (2013.01); *G21F 3/00* (2013.01);
(Continued)

(58) Field of Classification Search
CPC .......... G01V 5/005; G21F 3/00; G21F 1/085; G01N 23/046; G01N 2223/643; G01N 2223/639
See application file for complete search history.

(56) References Cited

U.S. PATENT DOCUMENTS 3,980,889 A * 9/1976 Haas .................. G01V 5/0008
378/57
5,818,897 A * 10/1998 Gordon ................ G01V 5/005
378/19
(Continued)

FOREIGN PATENT DOCUMENTS

JP    2005-241396    9/2005
JP    2012-159355    8/2012
(Continued)

OTHER PUBLICATIONS

International Search Report and Written Opinion dated Jan. 15, 2019 in connection with International Application No. PCT/US2018/058923.

*Primary Examiner* — Michael C Bryant
(74) *Attorney, Agent, or Firm* — Pandiscio & Pandiscio

(57) ABSTRACT

A method for scanning an object in an X-ray security inspection system, wherein the X-ray security inspection system comprises an ingoing tunnel equipped with radiation-shielding curtains, an X-ray section and an outgoing tunnel equipped with radiation-shielding curtains, the method comprising: passing the object through the ingoing tunnel at a first rate of speed and with a first extent of separation between successive objects; passing the object through the X-ray section at a second rate of speed and with a second extent of separation between successive objects; and passing the object through the outgoing tunnel at a third rate of speed and with a third extent of separation between successive objects; wherein the second rate of speed is less than the first rate of speed and the third rate of speed, and wherein the second extent of separation between successive objects is less than the first extent of separation between successive objects and the third extent of separation between successive objects.

22 Claims, 11 Drawing Sheets

Related U.S. Application Data

(60) Provisional application No. 62/587,798, filed on Nov. 17, 2017, provisional application No. 62/580,917, filed on Nov. 2, 2017.

(51) Int. Cl.
*G21F 1/08* (2006.01)
*G21F 3/00* (2006.01)

(52) U.S. Cl.
CPC . *G01N 2223/639* (2013.01); *G01N 2223/643* (2013.01)

(56) References Cited

U.S. PATENT DOCUMENTS

| | | |
|---|---|---|
| 7,151,817 B1 | 12/2006 | Abraham et al. |
| 2005/0185757 A1 | 8/2005 | Kresse et al. |
| 2007/0217571 A1 | 9/2007 | Teslyar et al. |
| 2009/0238336 A1 | 9/2009 | Akely |
| 2012/0160638 A1 | 6/2012 | Baker et al. |
| 2016/0372223 A1 | 12/2016 | Splinter et al. |
| 2017/0131428 A1 | 5/2017 | Langeveld et al. |
| 2017/0178759 A1* | 6/2017 | Forsythe .............. G21F 1/02 |
| 2019/0129059 A1* | 5/2019 | Connelly .............. G01V 5/005 |

FOREIGN PATENT DOCUMENTS

| | | |
|---|---|---|
| JP | 2014-092410 | 5/2014 |
| KR | 10-2016-0014760 | 2/2016 |
| WO | WO 2012/035440 | 3/2012 |
| WO | WO 2015/114411 | 8/2015 |
| WO | WO 2015/155219 | 10/2015 |

\* cited by examiner

COMPUTED TOMOGRAPHY (CT) SECURITY INSPECTION SYSTEM WITH ENHANCED X-RAY SHIELDING

REFERENCE TO PENDING PRIOR PATENT APPLICATIONS

This patent application:

(i) is a continuation-in-part of pending prior U.S. patent application Ser. No. 16/178,821, filed Nov. 02, 2018 by IDSS Holdings, Inc. and Benjamin Galen Connelly et al. for METHOD AND APPARATUS TO REDUCE RADIATION EMISSIONS ON A PARCEL SCANNING SYSTEM, which patent application claims benefit of prior U.S. Provisional Patent Application Ser. No. 62/580,917, filed Nov. 02, 2017 by IDSS Holdings, Inc. and Benjamin Galen Connelly et al. for METHOD AND APPARATUS TO REDUCE RADIATION EMISSIONS ON A PARCEL SCANNING SYSTEM; and (ii) claims benefit of prior U.S. Provisional Patent Application Ser. No. 62/587,798, filed Nov. 17, 2017 by Photo Diagnostic Systems, Inc. and Bernard M. Gordon et al. for COMPUTED TOMOGRAPHY (CT) SECURITY INSPECTION SYSTEM WITH ENHANCED X-RAY SHIELDING, which patent application is hereby incorporated herein by reference.

FIELD OF THE INVENTION

This invention relates to X-ray security inspection systems in general, and more particularly to computed tomography (CT) security inspection systems with enhanced X-ray shielding.

BACKGROUND OF THE INVENTION

X-ray security inspection systems are widely used at airports and other security-sensitive locations to scan baggage and other containers for explosives and other contraband. These X-ray security inspection systems typically have one (or a few) fixed (i.e., stationary) X-ray sources running at low power (e.g., 2 mA) at approximately 160,000 volts (i.e., 160 kV). The bags or containers (typically loaded in trays) are moved past the fixed X-ray source(s) on a conveyor belt.

When the X-rays impinge upon a bag or other container passing by the X-ray source(s) on the conveyor belt, moderate amounts of scattered X-rays are emitted from the bag or other container under scrutiny. Some of these scattered X-rays are reflected in the directions of the ingoing or outgoing segments of the conveyor belt which is moving the bags or containers past the fixed X-ray source(s). To avoid X-ray exposure to humans that may be near the entrance to the X-ray security inspection system (i.e., the "ingoing tunnel" containing the ingoing segment of the conveyor belt) or near the exit of the X-ray security inspection system (i.e., the "outgoing tunnel" containing the outgoing segment of the conveyor belt), a number of lead-containing curtains (e.g., 3 to 6 curtains) have hitherto been placed in each of the tunnels (i.e., in each of the ingoing and outgoing tunnels).

In these older X-ray security inspection systems, a typical throughput rate for the trays (also sometimes called bins) containing the bags or other containers has generally been in the range of 200 (or at most 300) trays per hour. Therefore, at these low rates of passage of trays through the ingoing and outgoing tunnels where the lead-containing curtains were located, a tray could move through that relatively low number of curtains with adequate spacing between the trays, and hence with adequate time for the curtains to be pushed up, and then fall back down, between the trays containing the bags or other containers being scanned.

So, in summary, with the older X-ray security inspection systems which involved a combination of low X-ray power and low tray throughput, a modest number of lead-containing curtains were able to adequately attenuate the moderate amount of scattered X-rays being emitted into the ingoing and outgoing tunnels from the bags or other containers carried by the trays.

However, over the past few years, it has become evident to those responsible for airport security that the effectiveness of these older X-ray security inspection systems is grossly inadequate. In response, a number of companies commenced the design of computed tomography (CT) security inspection systems. Such CT security inspection systems are intended to have a throughput rate of approximately 600 trays per hour (i.e., 600 bags or other containers per hour). These CT security inspection systems, which make many X-ray projections (e.g., 1,000 or more projections per rotation of the CT machine), necessarily use higher power X-ray, typically 5-8 mA at 160 kV, and furthermore use about 24 rows of projections simultaneously. As a result, the power of the scattered X-rays from the CT security inspection systems is almost 100 times greater than the power of the scattered X-rays from the older X-ray security inspection systems, and it has become clear that a practical solution needs to be found to reduce the scattered X-rays emanating from the ingoing and outgoing tunnels of the CT security inspection systems.

Initially, it appeared that this problem could be solved by simply adding more lead-containing curtains at the ingoing and outgoing tunnels of the CT security inspection system. However, this is not the case. To understand the magnitude of the problem, consider that, because the CT security inspection systems produce nearly one hundred times more scattered X-rays than the older X-ray security inspection systems, it is necessary to reduce the level of scattered X-rays emanating from the ingoing and outgoing tunnels by a factor of 30,000:1, rather than the previous requirement of approximately 300:1. Note that a curtain with a lead equivalency of 0.5 mm lead thickness attenuates the scattered X-rays by a factor of about 5.5:1. For four curtains, this factor is raised to the fourth power, which results in an attenuation of about 915:1, which is more than enough attenuation for the older X-ray security inspection systems. That is, it took only four curtains of 0.5 mm lead equivalent to adequately shield the ingoing and outgoing tunnels of the older X-ray security inspection systems, but takes at least six such curtains being "fully down" to produce the attenuation of 30,000:1 required by the CT security inspection systems. Furthermore, at the high throughput speeds of the CT security inspection systems, where a tray is almost always disposed under (and displacing) some of the curtains, it takes more than six installed curtains to provide the at least six "fully down" curtains at any given time. However, if this larger number of lead-containing curtains is installed at the ingoing and outgoing tunnels of the CT security inspection system, the lead-containing curtains must be closer to each other (since the length of the ingoing and outgoing tunnels is generally heavily constrained by the space available for the CT security inspection system), and this causes the double problem of (i) the tray must be pushed harder to lift more curtains, and (ii) the curtains do not come "fully down" until after the entire tray has passed by the curtain by a distance which is somewhat greater than at least an additional 30 cm or so (this distance is a function of the height of the trays and the bags or containers loaded in the trays, etc.). So, simply adding more curtains does not work at all for the higher throughput rate of the CT security inspection systems.

See FIGS. 1-5, which illustrate how the lead-containing curtains do not come "fully down" at the higher throughput rate of the CT security inspection systems.

More particularly, FIGS. 1-5 show an exemplary prior art CT security inspection system 5. CT security inspection system 5 generally comprises a CT machine 10 having a rotating focal spot 15 producing a multi-row X-ray 20. Ingoing and outgoing tunnels 25, 30 provide ingress and egress for a conveyor belt 35 to move trays 40 (containing bags or containers) past rotating focal spot 15 of CT machine 10. Lead-containing curtains 45 are disposed in ingoing and outgoing tunnels 25, 30.

With a throughput rate of 600 trays per hour (i.e., one tray every six seconds), and with conveyor belt 35 moving at 15 cm per second (a typical speed to enable the required image quality from CT machine 10), one tray passes along the conveyor belt every 6 seconds. Where each tray has a length of 60 cm, this means that there is a 30 cm spacing between trays on the X-ray conveyor belt (i.e., a belt speed of 15 cm per second and one tray every six seconds equals 90 cm between trays and, with each tray having a length of 60 cm, this yields 30 cm spacing between trays). However, with only 30 cm spacing between trays running on a belt moving at 15 cm per second, there is insufficient time for a displaced lead-containing curtain to come back down to its "fully down" position between trays. Thus, with a throughput rate of 600 trays per hour, and with a conveyor belt speed of 15 cm per second, the lead-containing curtains of the CT security inspection system cannot adequately shield scattered X-rays passing through the ingoing and outgoing tunnels of the CT security inspection system. This issue is discussed in greater detail below.

Another approach proposed for attenuating X-rays exiting the ingoing and outgoing tunnels of a CT security inspection system was to make the ingoing and outgoing tunnels much longer so that the lead-containing curtains could be spaced much farther apart. In theory, this approach might give the curtains time to come "fully down" between successive trays, but in practice it requires the ingoing and outgoing tunnels to be excessively longer than is generally allowed by the space constraints present at airports and other security-sensitive locations.

Another approach for attenuating X-rays exiting the ingoing and outgoing tunnels of a CT security inspection system is described in U.S. Patent Application Publication No. US2016/0372223 A1. The approach of U.S. Patent Application Publication No. US2016/0372223 A1 uses rotating curtains between successive trays. However, in practice, this approach does not work because the rotating curtains need to be precisely synchronized with tray movement in order to quickly come down between incoming trays. Furthermore, this approach does not work at the higher, desired throughput rate of the newer CT security inspection systems, since it is difficult to get enough curtains fully down between the trays to provide the required level of X-ray attenuation.

Still another proposed approach was to provide multiple curtains on reels going rapidly up and down between successive trays. Aside from the engineering complexity and power requirements needed to make the curtains go up and down fast enough, such an approach is excessively costly, adding significant expense in each ingoing and outgoing tunnel.

Yet another proposed approach was to build a complicated contrivance which would open the ingoing tunnel for a short period of time, push the tray in rapidly for scanning, reverse the process at the outgoing tunnel, and then repeat the process for the next tray. While theoretically possible, the difficulty, reliability and power required by such a complicated system has been found to be impractical.

Yet another approach might be, for a given desired throughput rate, to significantly speed up the conveyor belt speed through the system. This approach would allow the trays to go through the system faster, with more space between the successive trays, so that the lead-containing curtains in the ingoing and outgoing tunnels will have time to come down between successive trays. However, to obtain the same image quality at this higher throughput speed requires a proportionately higher power X-ray source or, alternatively, a significantly larger number of detector rows, or both, and it requires speeding up the rate of rotation of the gantry carrying the X-ray source of the CT scanner. Thus, this approach adds significantly to cost, and increases the power requirements for the system (which is generally not available at the airports and other security-sensitive locations in which the CT security inspection systems must be installed).

Thus there is a need for a new and improved computed tomography (CT) security inspection system with enhanced X-ray shielding.

SUMMARY OF THE INVENTION

The present invention comprises the provision and use of a new and improved computed tomography (CT) security inspection system with enhanced X-ray shielding.

In one preferred form of the invention, there is provided a method for scanning an object in an X-ray security inspection system, wherein the X-ray security inspection system comprises an ingoing tunnel equipped with radiation-shielding curtains, an X-ray section and an outgoing tunnel equipped with radiation-shielding curtains, the method comprising:

passing the object through the ingoing tunnel at a first rate of speed and with a first extent of separation between successive objects;

passing the object through the X-ray section at a second rate of speed and with a second extent of separation between successive objects; and passing the object through the outgoing tunnel at a third rate of speed and with a third extent of separation between successive objects;

wherein the second rate of speed is less than the first rate of speed and the third rate of speed, and wherein the second extent of separation between successive objects is less than the first extent of separation between successive objects and the third extent of separation between successive objects.

In another preferred form of the invention, there is provided apparatus for scanning an object, the apparatus comprising:

an X-ray security inspection system, wherein the X-ray security inspection system comprises an ingoing tunnel equipped with radiation-shielding, an X-ray section and an outgoing tunnel equipped with radiation-shielding curtains;

apparatus for passing the object through the ingoing tunnel at a first rate of speed and with a first extent of separation between successive objects;

apparatus for passing the object through the X-ray section at a second rate of speed and with a second extent of separation between successive objects; and apparatus for passing the object through the outgoing tunnel at a third rate of speed and with a third extent of separation between successive objects;

wherein the second rate of speed is less than the first rate of speed and the third rate of speed, and wherein the second extent of separation between successive objects is less than the first extent of separation between successive objects and the third extent of separation between successive objects.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

The present invention comprises the provision and use of a new and improved computed tomography (CT) security inspection system with enhanced X-ray shielding.

More particularly, to further understand the X-ray shielding problem associated with prior art computed tomography (CT) security inspection systems and to fully appreciate the novel solution to this problem which is provided by the present invention, it should first be recognized that a standard tray length in the U.S. is approximately 60 cm (approximately two feet), and in Europe the standard tray length is approximately 70 cm. As an actual example, it is generally desired to have a CT security inspection system operate at 600 trays per hour. This is one tray every six seconds. Then, at 600 trays per hour, the distance between successive trays would be as follows for various conveyor speeds.

| Conveyor Speed | Tray Spacing (at 6 seconds per tray) | Average Space Between Trays In U.S. | Average Space Between Trays In Europe |
| --- | --- | --- | --- |
| At 15 cm per second | 90 cm | 30 cm | 20 cm |
| At 17.5 cm per second | 105 cm | 45 cm | 35 cm |
| At 20 cm per second | 120 cm | 60 cm | 50 cm |
| At 22.5 cm per second | 135 cm | 75 cm | 65 cm |
| At 25 cm per second | 150 cm | 90 cm | 75 cm |
| At 27.5 cm per second | 165 cm | 105 cm | 90 cm |

It should be further recognized that the conveyor speed is limited, in a practical sense, by a combination of factors, i.e., X-ray power, CT rotation speed, detector coverage in the direction of conveyor motion, and system pitch (which is defined as the ratio of the advance of the tray under scrutiny per rotation of the gantry containing the X-ray source divided by the effective length of the detector in the direction of conveyor motion). In practice, the X-ray power is generally limited by the power available at a security location in the airport; the rotation speed is generally limited by the permissible g-force of the equipment and the power available to rotate the gantry; the detector length is limited by cost; and the pitch is limited by the resultant image quality.

Figure 1:
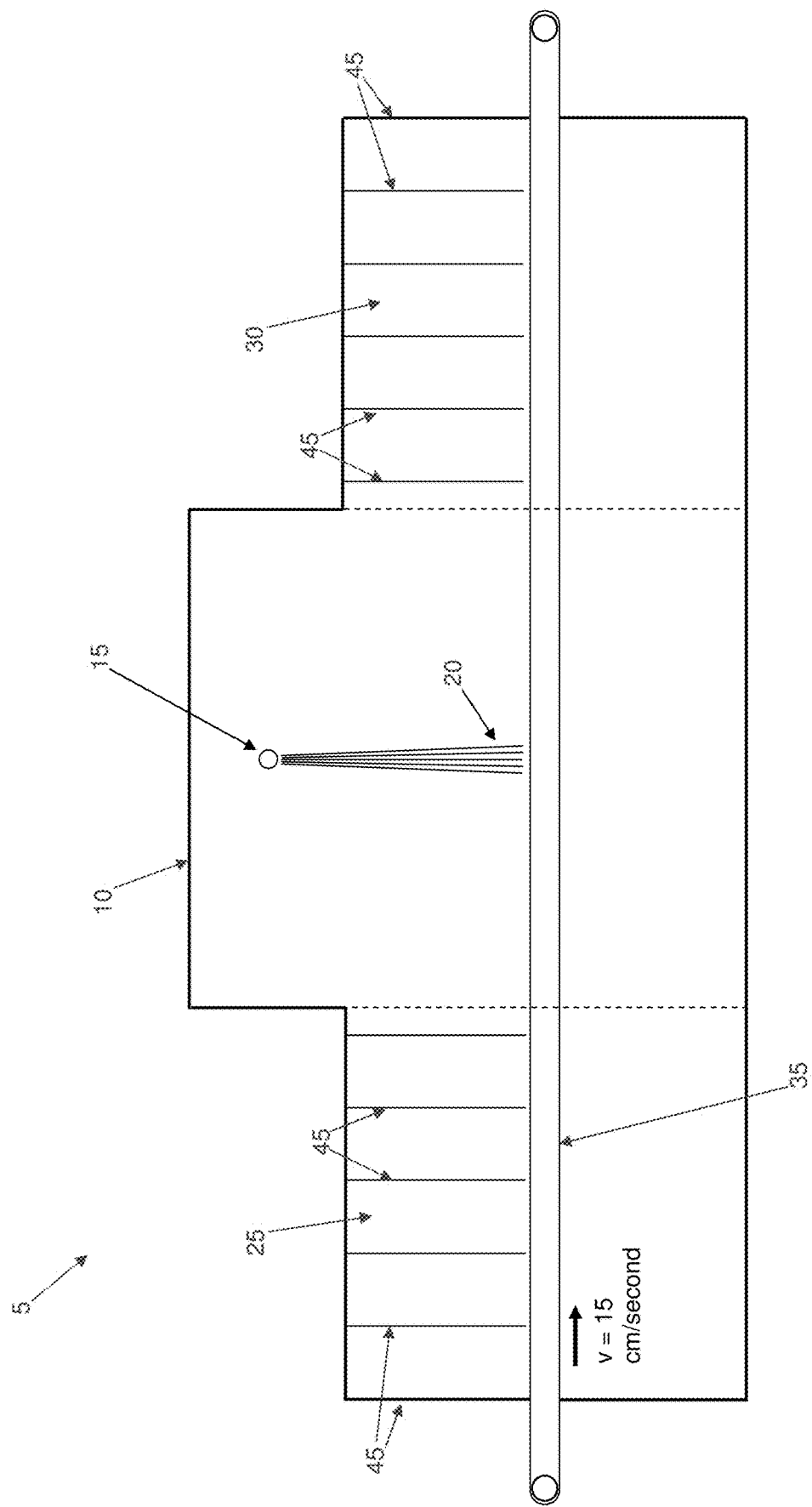
FIGS. 1-5 are schematic views showing how prior art CT security inspection systems do not allow a sufficient number of lead-containing curtains to come to their "fully down" position in the ingoing and outgoing tunnels to provide adequate X-ray shielding.
Figure 2:
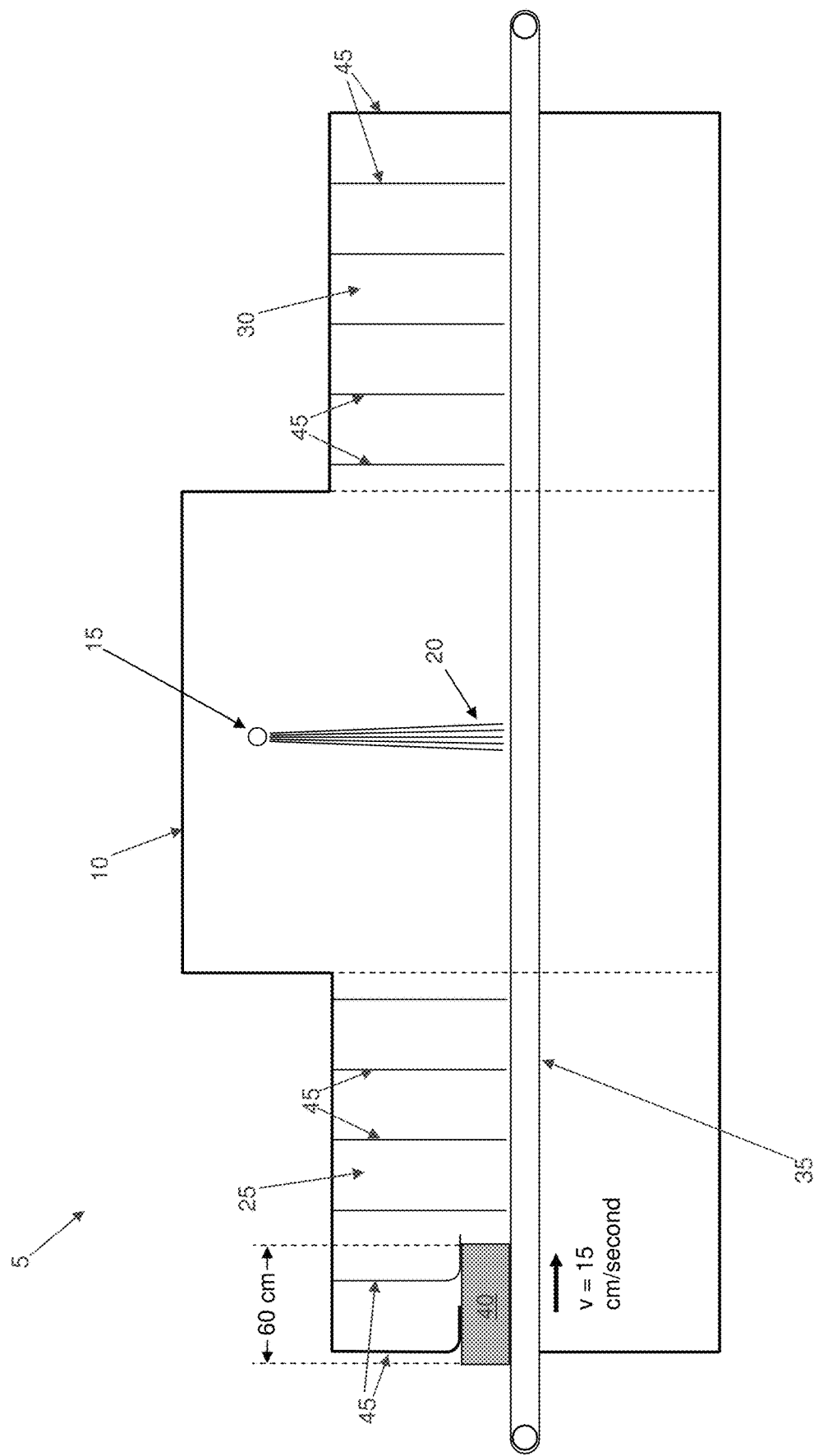
Figure 3:
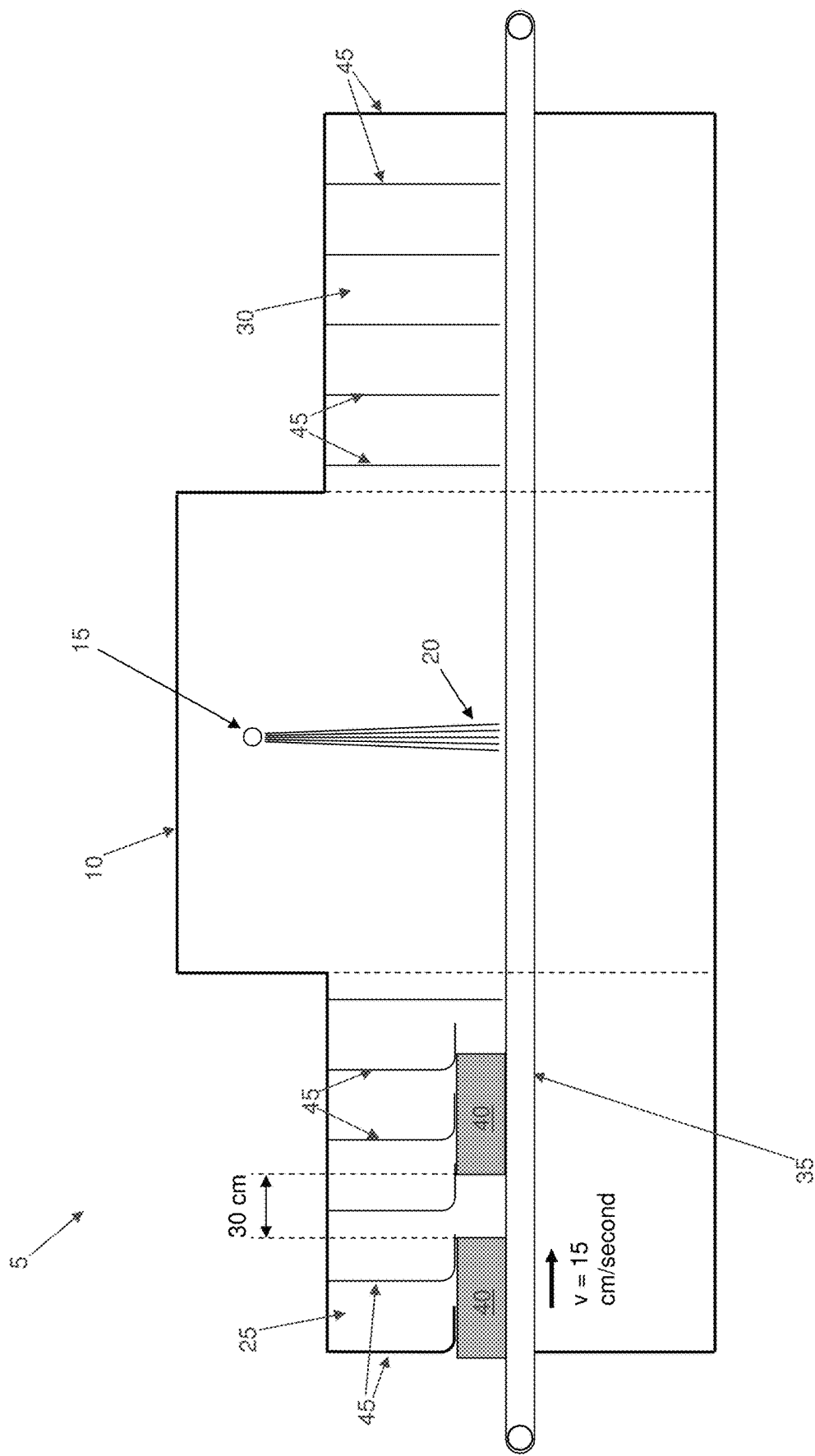
Figure 4:
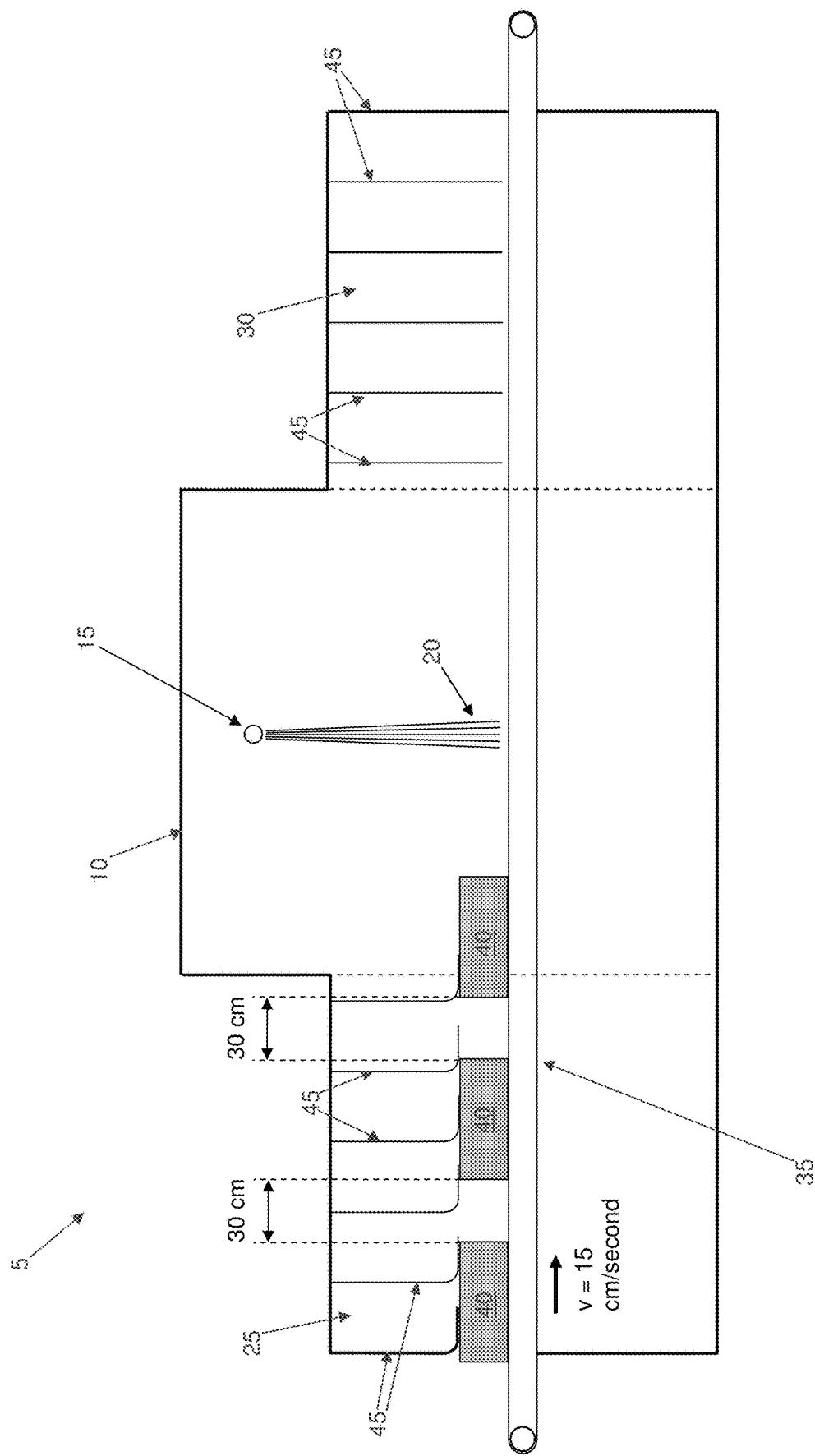
Figure 5:
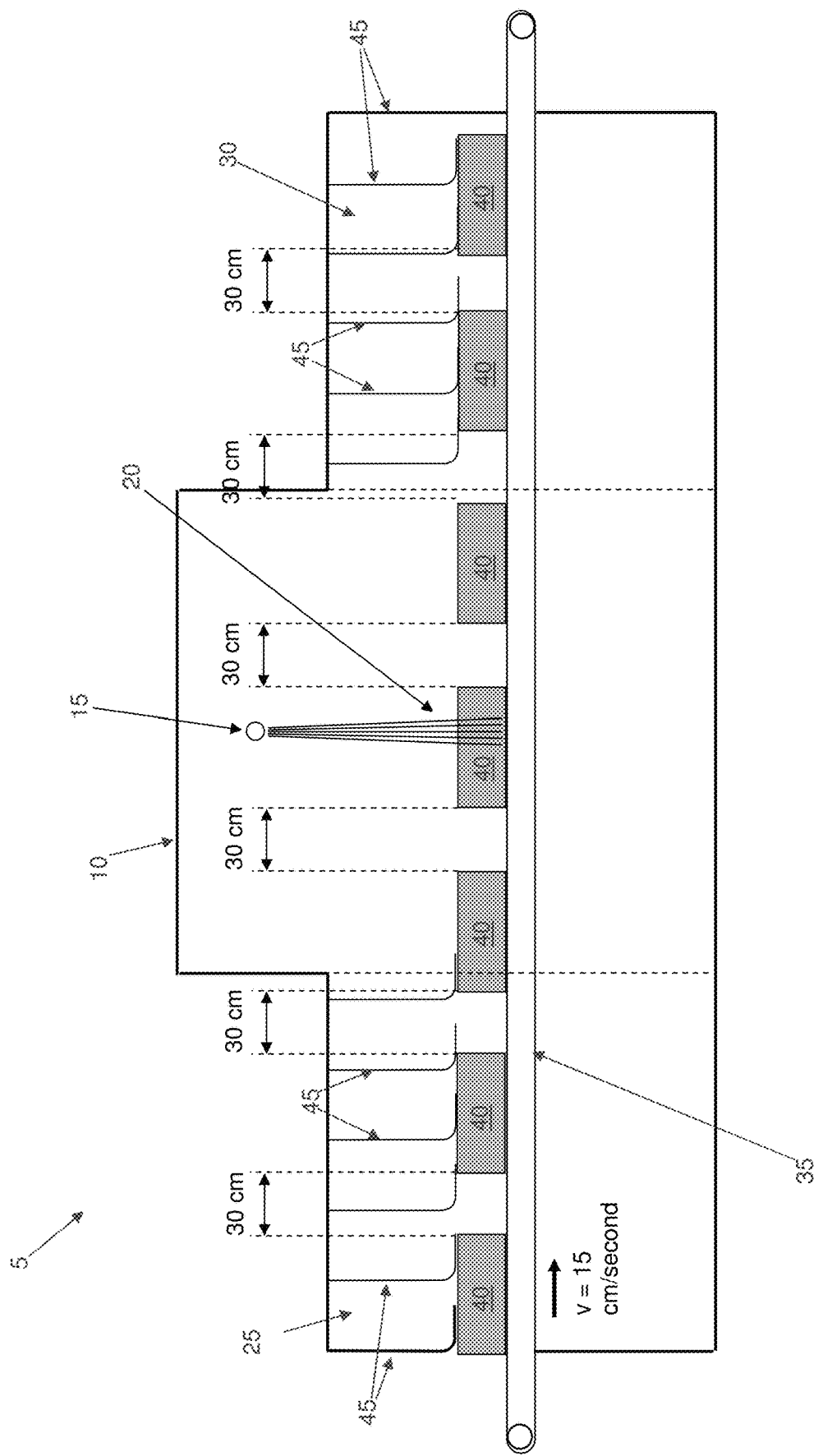

Taking into account the foregoing limitations, in practice, the conveyor speed through the CT machine is limited to approximately 15 cm per second in order to achieve acceptable image quality. A conveyor speed of 15 cm per second (with a system throughput of 600 trays per hour) yields a tray spacing of 90 cm between the start of successive trays (i.e., one tray every 6 seconds on a conveyor belt moving 15 cm per second yields a tray spacing of 90 cm between the start of successive trays). This implies a spacing between trays in the U.S. of 30 cm (90 cm−60 cm=30 cm) and a spacing between trays in Europe of 20 cm (90 cm−70 cm=20 cm). Initially, it was hoped that it might be possible to provide adequate X-ray shielding at the ingoing and outgoing tunnels by having enough curtains come down in the spaces between the trays to provide adequate X-ray shielding, but this has not proven to be the case because, when a tray (with its contents) pushes up a curtain, that curtain does not come back to its "fully down" position until the tray has moved more than 30 cm beyond the point where the curtain hangs. See FIGS. 1-5 and the discussion above in the section entitled "Background Of The Invention".

Thus, there can be defined a value (Equivalent Tray Length, or ETL) which is equal to the length of the tray plus the additional distance required for the curtain to come back to its "fully down" position. In practice, at a throughput rate of 600 trays per hour, the ETL is the sum of the tray length (e.g., 60 cm) plus a distance of more than 30 cm, i.e., a distance of greater than 90 cm.

Put another way, in order for there to be a sufficient gap between successive trays for the lead-containing curtains to come to their "fully down" position between successive trays when the trays are being placed on the input conveyor belt at a rate of one tray every 6 seconds (i.e., for a throughput of 600 trays per hour), the input conveyor belt must move significantly faster than 15 cm per second.

This provides an understanding of what has been the problem with prior art CT security inspection systems: running at 600 trays an hour, at a belt speed of 15 cm per second, the lead-containing curtains never have enough time to come back to their "fully down" position between trays. In fact, not even a single curtain, after being lifted up by a tray moving at 15 cm, can ever come back to its "fully down" position, since the following tray engages the curtain just as the curtain is about to reach its "fully down" position. Therefore, with prior art CT security inspection systems running at 600 trays an hour with a conveyor belt speed of 15 cm per second, it is not possible to provide the necessary X-ray attenuation.

The present invention recognizes that there is an upper limit, for each system, of the rate that the trays can go through the X-ray part of the system, for the reasons previously enumerated and discussed above, and the present invention recognizes that the trays cannot go through the ingoing and outgoing tunnels at speeds such that the spacing between successive trays is less than the equivalent tray length (ETL). In other words, the present invention recognizes that the trays cannot go through the X-ray part of the system at faster than 15 cm per second, and the present invention recognizes that the trays cannot go through the ingoing and outgoing tunnels at speeds which provide a spacing between successive trays which is less than the equivalent tray length (ETL), which is a distance greater than 90 cm.

The present invention addresses these issues in a novel way, by providing a high speed CT security inspection system which moves the trays through the ingoing and outgoing tunnels at a significantly faster rate than they are moved through the X-ray portion of the system, whereby to provide adequate scanning image quality while also enabling enhanced X-ray shielding. In the preferred form of the invention, this is achieved by providing three separate conveyor belts (i.e., one through the ingoing tunnel, one through the outgoing tunnel, and one through the X-ray portion of the system), and operating the ingoing and outgoing conveyor belts at higher rates of speed than the rate of speed of the conveyor belt through the X-ray portion of the system.

More particularly, in the preferred form of the invention, the rate of speed of the ingoing and outgoing conveyor belts is set high enough to provide adequate spacing between successive trays in order to allow the lead-containing curtains time to come back to their "fully down" position between successive trays, and the rate of speed of the conveyor belt through the X-ray portion of the system is set low enough to enable the required image quality to be achieved. Furthermore, the rate(s) of speed of the ingoing and outgoing conveyor belts is coordinated with the rate of speed of the conveyor belt through the X-ray portion of the system so as to provide a continuous stream of trays at the desired throughput rate.

By way of example but not limitation, where the throughput rate of the system is 600 trays per hour (i.e., one tray every six seconds), with an X-ray conveyor belt speed of 15 cm per second (a typical speed to enable the required image quality), one tray passes along the X-ray conveyor belt every six seconds, which means that there is a 30 cm spacing between trays on the X-ray conveyor belt (i.e., a belt speed of 15 cm per second and one tray every six seconds equals 90 cm between trays and, with each tray having a length of 60 cm, this yields 30 cm spacing between trays).

Depending on the length allowed for the ingoing and outgoing tunnels (nominally 3-5 feet each), which determines the spacing between the lead-containing curtains, the conveyor belt speed in the ingoing tunnel, and the conveyor belt speed in the outgoing tunnel, can be in the vicinity of 22 cm per second, which means that there is a 72 cm gap between trays on the ingoing and outgoing conveyor belts (i.e., a belt speed of 22 cm per second and one tray every six seconds equals 132 cm between trays and, with each tray having a length of 60 cm, this yields a 72 cm spacing between trays). This spacing allows the lead-containing curtains in the incoming and outgoing tunnels to come back to their "fully down" position between trays.

Thus, with the present invention, the ingoing and outgoing conveyor belts run at a higher rate of speed than the rate of speed of the conveyor belt through the X-ray portion of the system, and the spacing between trays in the ingoing and outgoing tunnels is greater than the spacing between trays in the scanning portion of the system.

The distribution between lead-containing curtains may be optimally spaced, depending on the actual length of the ingoing and outgoing tunnels, as long as the lead equivalency is, on average, that of six 0.5 mm lead-equivalent curtains in their "fully down" position. As one example, if the total available tunnel length for the ingoing and outgoing tunnels is about 4 or 5 feet, there may be five or six 0.5 mm lead-equivalent curtains, appropriately spaced, in each tunnel.

So, the creative solution to the problem is to have the trays move through the ingoing tunnel at a first rate of speed (e.g., 22-27 cm per second), then slow down as they move through the X-ray scanning portion at a second, slower rate of speed (e.g., 15 cm per second), and then move through the outgoing tunnel at a third rate of speed which is higher than the second rate of speed (e.g., 22-27 cm per second).

Figure 6:
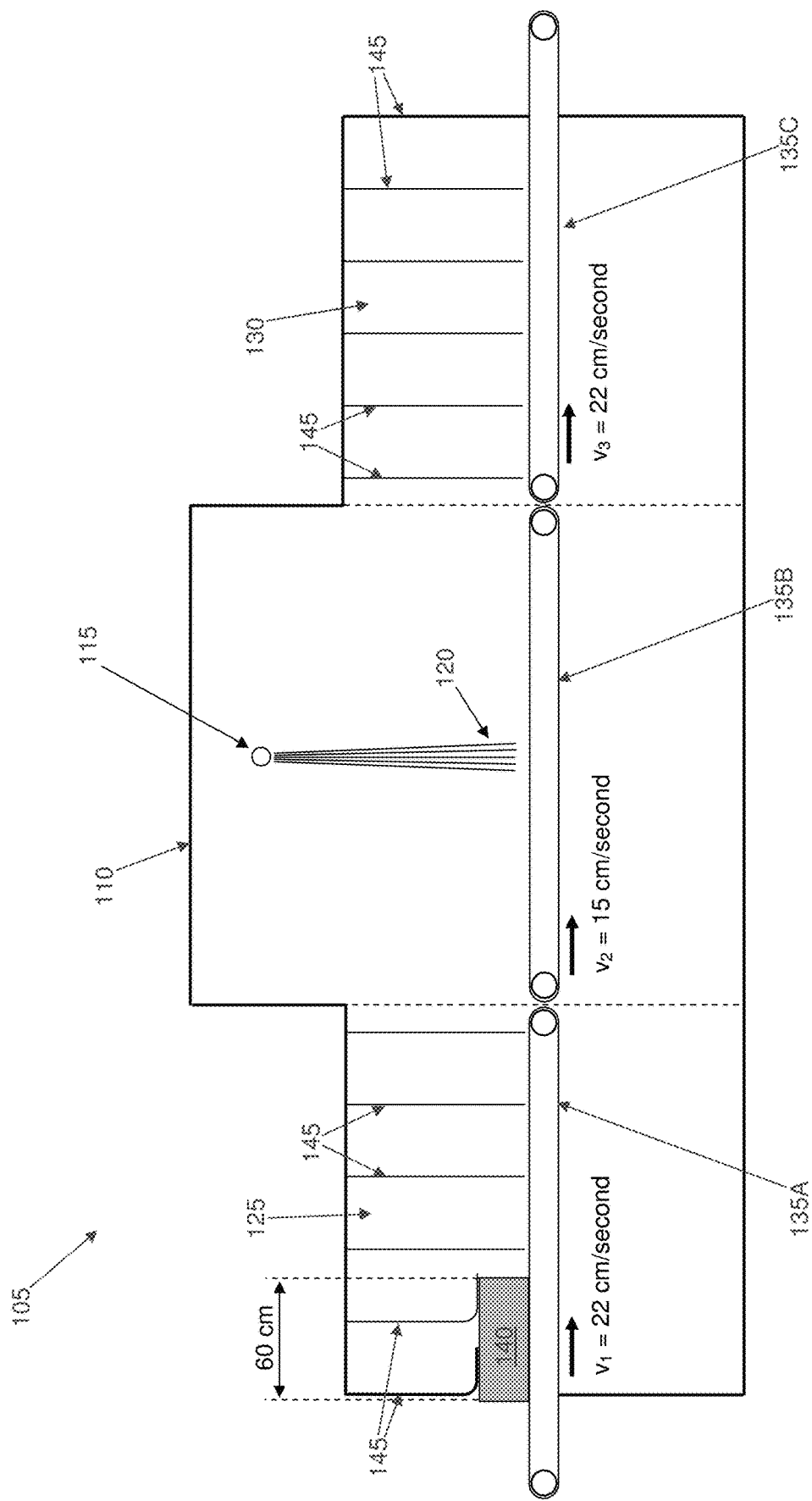
FIGS. 6-11 are schematic views showing how the present invention enables a sufficient number of lead-containing curtains to come to their "fully down" position in the ingoing and outgoing tunnels to provide adequate X-ray shielding for a CT security inspection system.
Figure 7:
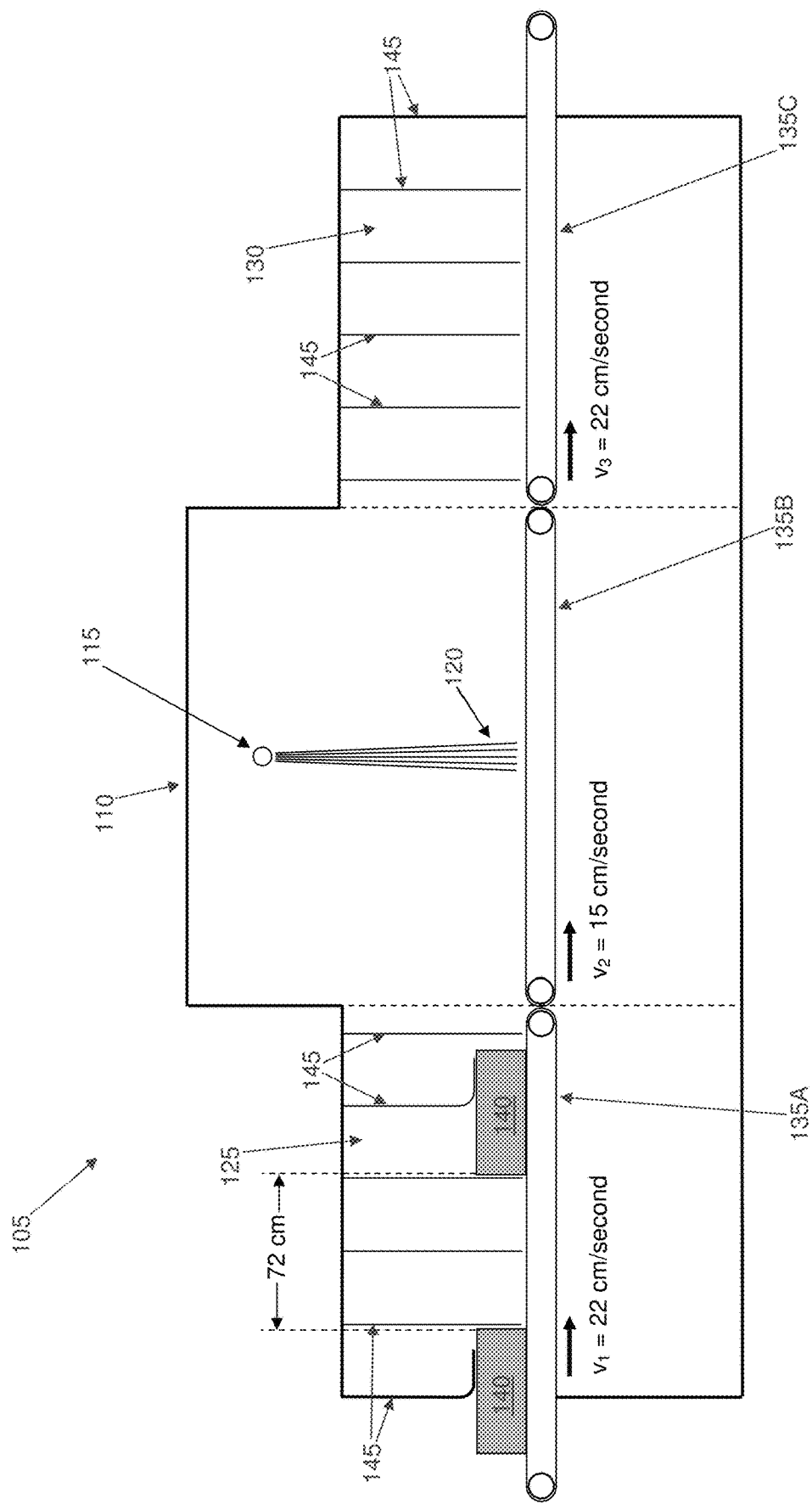
Figure 8:
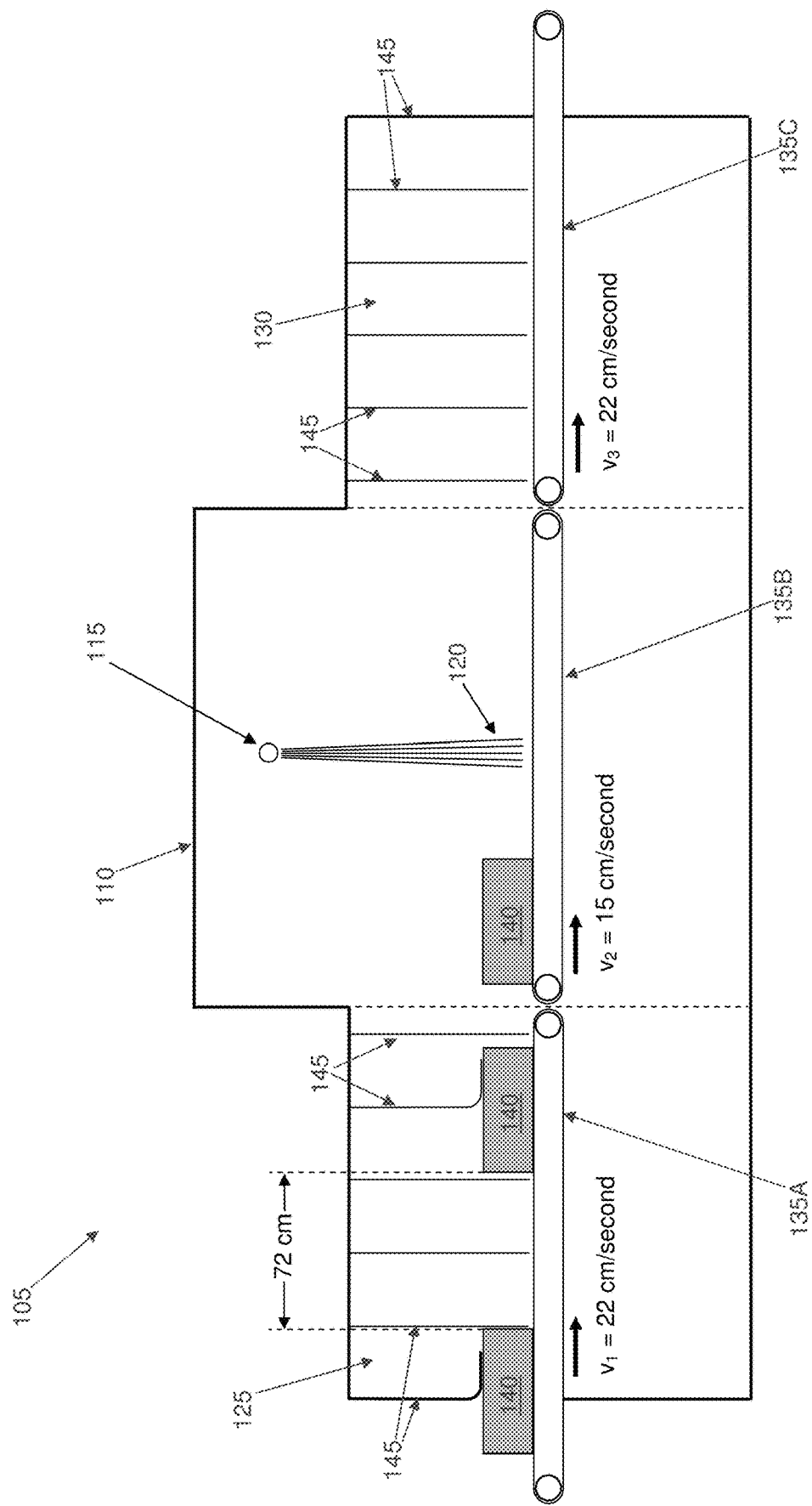
Figure 9:
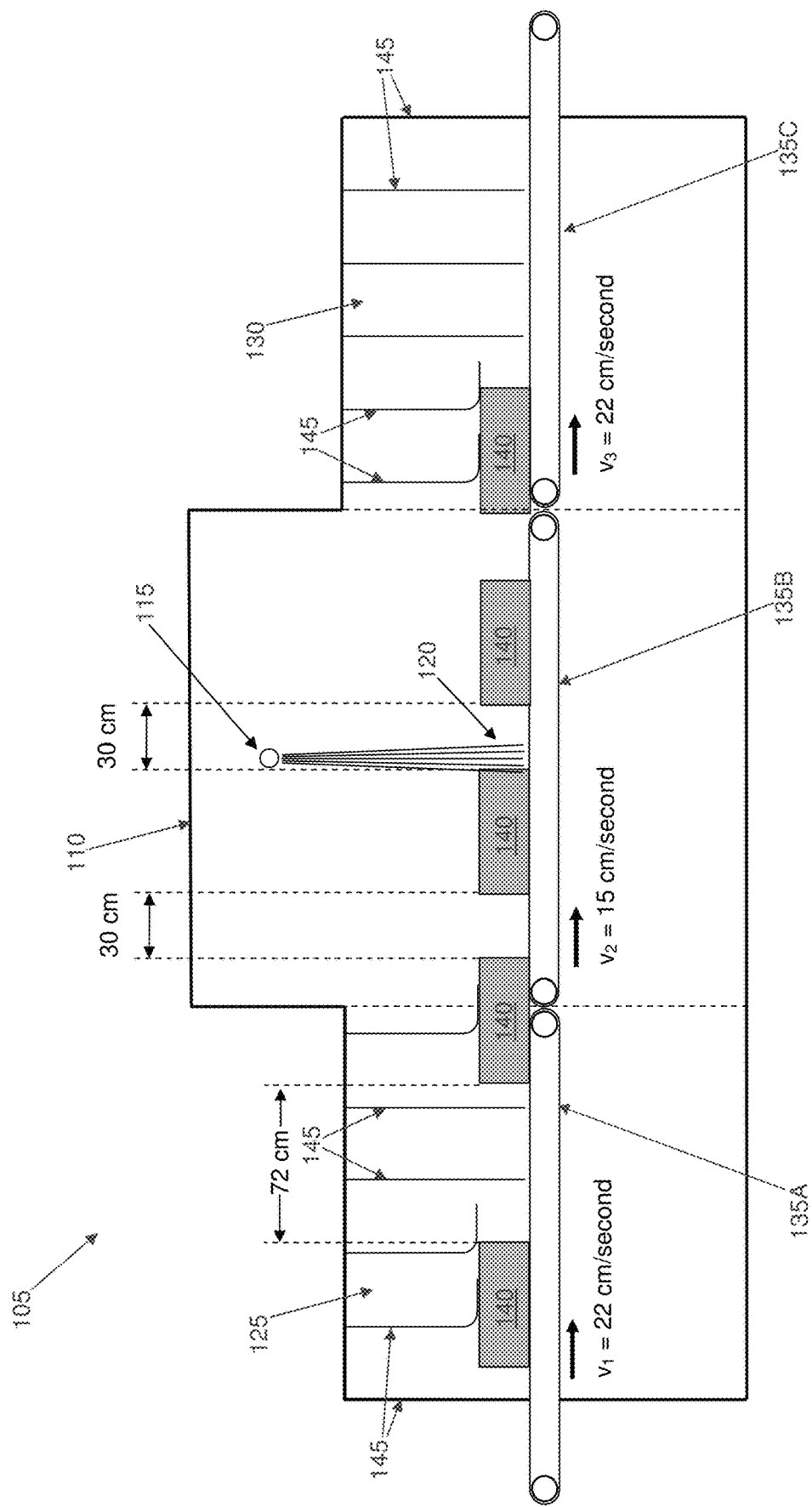
Figure 10:
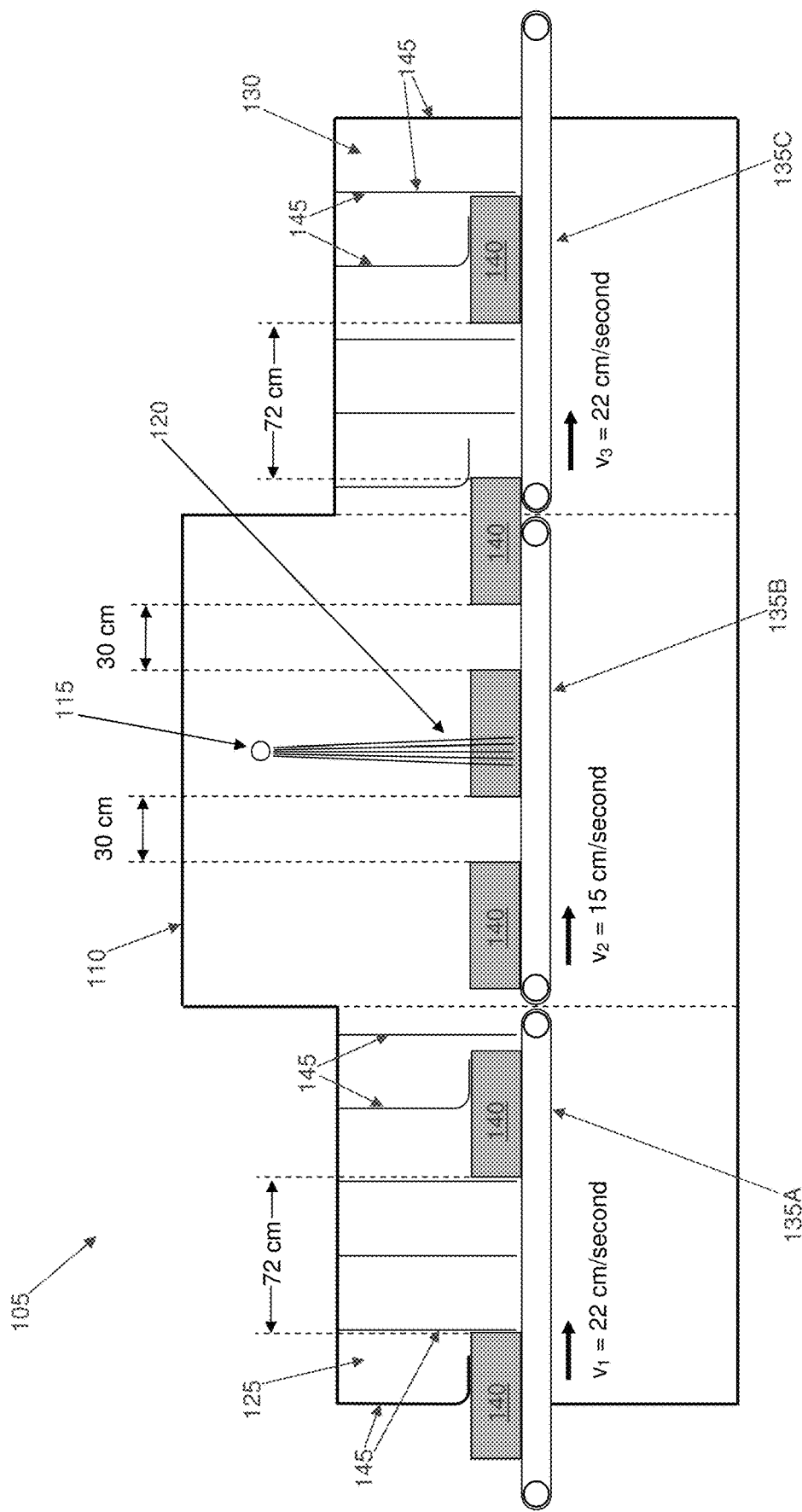
Figure 11:
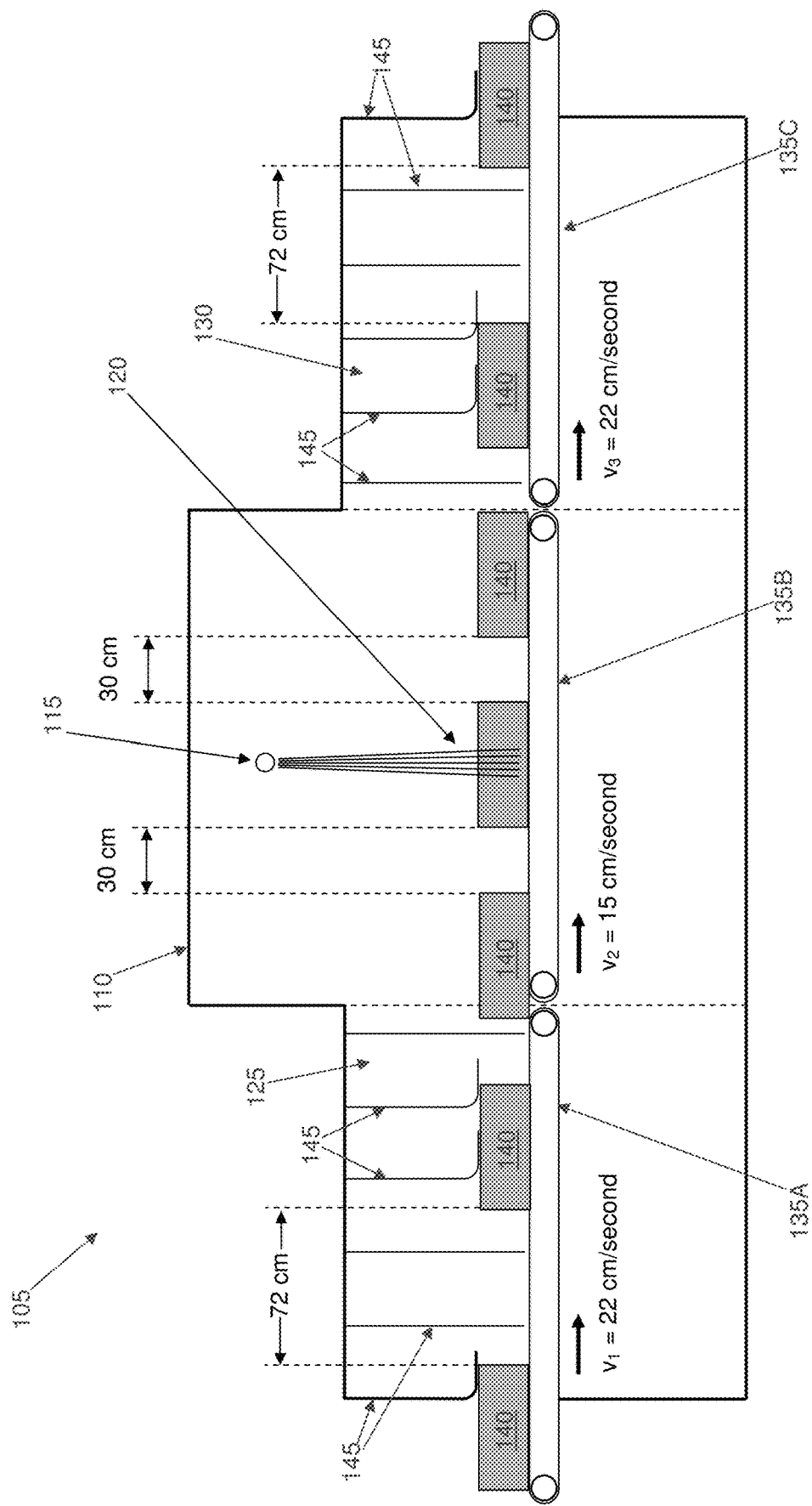

Note that the rate of speed of the ingoing conveyor belt (and the spacing between successive trays on the ingoing conveyor belt) may be, but is not necessarily, the same as the rate of speed of the outgoing conveyor belt (and the spacing between successive trays on the outgoing conveyor belt). In practice, they could have different rates of speed (and different spacing between successive trays). What is required is that (i) the throughput of the outgoing conveyor belt has to be equal to the throughput of the ingoing conveyor belt (and, the throughputs of the ingoing and outgoing conveyor belts have to be equal to the throughputs of the scanning conveyor belt); (ii) the rate of speed of the ingoing and outgoing conveyor belts have to be high enough to permit an adequate number of the lead-containing curtains to fall back to their "fully down" position between successive trays; and (iii) the rate of speed of the conveyor belt through the scanning portion has to be low enough to enable adequate image quality. In one preferred form of the invention, and looking now at FIGS. 6-11, there is provided a novel CT security inspection system 105 formed in accordance with the present invention. CT security inspection system 105 generally comprises a CT machine 110 having a rotating focal spot 115 producing a multi-row X-ray 120. Ingoing and outgoing tunnels 125, 130 provide access to the scanning region of CT machine 110. An ingoing conveyor belt 135A, a scanning conveyor belt 135B and an outgoing conveyor belt 135C serve to move trays 140 (containing bags or containers) through ingoing tunnel 125, past rotating focal spot 115 of CT machine 110, and out outgoing tunnel 130. Lead-containing curtains 145 are disposed in ingoing and outgoing tunnels 125, 130.

In accordance with the present invention, ingoing conveyor belt 135A moves trays 140 through ingoing tunnel 125 at a first rate of speed (e.g., 22-27 cm per second), scanning conveyor belt 135B moves trays 140 through the X-ray scanning portion of CT machine 110 at a second, slower rate of speed (e.g., 15 cm per second), and outgoing conveyor belt 135C moves trays 140 through outgoing tunnel 130 at a third rate of speed which is higher than the second rate of speed (e.g., 22-27 cm per second). The first and third rates of speed of ingoing conveyor belt 135A and outgoing conveyor belt 135C, respectively, are high enough to provide adequate spacing between adjacent trays 140, whereby to permit an adequate number of the lead-containing curtains 145 to return to their "fully down" position between successive trays 140. The second rate of speed of scanning conveyor belt 135B is low enough to enable adequate image quality.

If desired, the lead-containing curtains of the novel CT security inspection system may be replaced by radiation-shielding curtains utilizing other X-ray barrier materials, e.g., tungsten, barium, etc.

And, if desired, ingoing conveyor belt 135A, scanning conveyor belt 135B and/or outgoing conveyor belt 135C may be replaced by other apparatus for moving an object (e.g., a tray containing a bag or container) through the novel CT security inspection system. By way of example but not limitation, ingoing conveyor belt 135A, scanning conveyor belt 135B and/or outgoing conveyor belt 135C may be replaced by a pathway comprising a series of powered rollers, etc.

In addition to the foregoing, the present invention preferably incorporates features making it easier for the trays (or other such entity under test) to more easily lift up the lead-containing curtains. These features may include one or more of the following: (i) putting one or more flexible hinges at the top of, or vertically within, each lead-containing curtain, (ii) appropriately staggering the lead-containing curtains (or the vertical subcomponents of the lead-containing curtains), and (iii) optimally varying the combinations and patterns of the lead-containing curtains, such as their spacing or layered distribution weightings.

MODIFICATIONS OF THE PREFERRED EMBODIMENTS

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A method for scanning an object in an X-ray security inspection system, wherein the X-ray security inspection system comprises an ingoing tunnel equipped with radiation-shielding curtains, an X-ray section and an outgoing tunnel equipped with radiation-shielding curtains, the method comprising:
   passing the object through the ingoing tunnel at a first rate of speed and with a first extent of separation between successive objects;
   passing the object through the X-ray section at a second rate of speed and with a second extent of separation between successive objects; and
   passing the object through the outgoing tunnel at a third rate of speed and with a third extent of separation between successive objects;
   wherein the second rate of speed is less than the first rate of speed and the third rate of speed, and wherein the second extent of separation between successive objects is less than the first extent of separation between successive objects and the third extent of separation between successive objects.

2. A method according to claim 1 wherein the X-ray security inspection system comprises a CT security inspection system.

3. A method according to claim 1 wherein the second rate of speed is 15 cm per second or less.

4. A method according to claim 1 wherein the first and third rates of speed are the maximum speed which permits at least one radiation-shielding curtain to fall back to its "fully down" position between successive objects.

5. A method according to claim 1 wherein the first and third rates of speed are 22-27 cm per second.

6. A method according to claim 1 wherein the first and third rates of speed are the same.

7. A method according to claim 1 wherein the first and third rates of speed are different from one another.

8. A method according to claim 1 wherein the radiation-shielding curtains comprise lead-containing curtains.

9. Apparatus for scanning an object, the apparatus comprising:
   an X-ray security inspection system, wherein the X-ray security inspection system comprises an ingoing tunnel equipped with radiation-shielding curtains, an X-ray section and an outgoing tunnel equipped with radiation-shielding curtains;
   apparatus for passing the object through the ingoing tunnel at a first rate of speed and with a first extent of separation between successive objects;
   apparatus for passing the object through the X-ray section at a second rate of speed and with a second extent of separation between successive objects; and
   apparatus for passing the object through the outgoing tunnel at a third rate of speed and with a third extent of separation between successive objects;
   wherein the second rate of speed is less than the first rate of speed and the third rate of speed, and wherein the second extent of separation between successive objects is less than the first extent of separation between successive objects and the third extent of separation between successive objects.

10. Apparatus according to claim 9 wherein the X-ray security inspection system comprises a CT security inspection system.

11. An apparatus according to claim 9 wherein the second rate of speed is 15 cm per second or less.

12. Apparatus according to claim 9 wherein the first and third rates of speed are the maximum speed which permits at least one radiation-shielding curtain to fall back to its "fully down" position between successive objects.

13. A method according to claim 9 wherein the first and third rates of speed are 22-27 cm per second.

14. A method according to claim 9 wherein the first and third rates of speed are the same.

15. A method according to claim 9 wherein the first and third rates of speed are different from one another.

16. Apparatus according to claim 9 wherein the apparatus for passing the object through the ingoing tunnel comprises a first conveyor belt.

17. Apparatus according to claim 9 wherein the apparatus for passing the object through the X-ray section comprises a second conveyor belt.

18. Apparatus according to claim 9 wherein the apparatus for passing the object through the outgoing tunnel comprises a third conveyor belt.

19. Apparatus according to claim 9 wherein the apparatus for passing the object through the ingoing tunnel comprises a series of powered rollers.

20. Apparatus according to claim 9 wherein the apparatus for passing the object through the X-ray section comprises a series of powered rollers.

21. Apparatus according to claim 9 wherein the apparatus for passing the object through the outgoing tunnel comprises a series of powered rollers.

22. Apparatus according to claim 9 wherein the radiation-shielding curtains comprise lead-containing curtains.

* * * * *